(12) United States Patent
Kurihara

(10) Patent No.: US 7,665,360 B2
(45) Date of Patent: Feb. 23, 2010

(54) VIBRATION GYRO CIRCUITRY, VIBRATION GYRO UNIT, AND METHOD FOR DETECTING VIBRATION GYRO OUTPUT

(75) Inventor: Kazuo Kurihara, Saitama (JP)

(73) Assignee: Sony Corporation, Tokyo (JP)

( * ) Notice: Subject to any disclaimer, the term of this patent is extended or adjusted under 35 U.S.C. 154(b) by 288 days.

(21) Appl. No.: 10/596,252

(22) PCT Filed: Sep. 28, 2005

(86) PCT No.: PCT/JP2005/017853

§ 371 (c)(1),
(2), (4) Date: Jun. 6, 2006

(87) PCT Pub. No.: WO2006/040931

PCT Pub. Date: Apr. 20, 2006

(65) Prior Publication Data

US 2008/0276708 A1    Nov. 13, 2008

(30) Foreign Application Priority Data

Oct. 8, 2004    (JP)    ............................. 2004-295983

(51) Int. Cl.
*G01P 9/04* (2006.01)
*G01C 19/00* (2006.01)
(52) U.S. Cl. ................. 73/504.12; 73/504.14
(58) Field of Classification Search .............. 73/504.12, 73/504.13, 504.14, 504.04, 504.15, 504.16
See application file for complete search history.

(56) References Cited

U.S. PATENT DOCUMENTS 5,473,288 A * 12/1995 Kumada .................. 331/116 R (Continued)

FOREIGN PATENT DOCUMENTS

JP    04-106410    4/1992

(Continued)

OTHER PUBLICATIONS

International Search Report dated Dec. 13, 2005.

(Continued)

*Primary Examiner*—Helen C. Kwok
(74) *Attorney, Agent, or Firm*—Sonnenschein Nath & Rosenthal LLP

(57) ABSTRACT

Vibration gyro circuitry, a vibration gyro unit, and a method for detecting a vibration gyro output, which enable detection of a rotational angular velocity with high sensitivity, are provided. The circuitry and the unit includes a differential amplifier circuit (4) for outputting a signal Vda corresponding to a difference (Vgl−Vgr) between output signals of two detection pieces of a vibration gyro (31), a synchronous detection circuit (5) for synchronously detecting the output signal Vda of the differential amplifier circuit (4), and a phase shift circuit for supplying to the synchronous detection circuit (5) a signal, as a timing signal Vck for the synchronous detection, which is phase-shifted with respect to a drive signal (an output signal of an adding circuit 1) Vsa supplied to the vibration gyro (31). The phase difference θps between the drive signal Vsa and the timing signal Vck is set on the basis of a phase difference characteristic of a detection sensitivity S for the output signal Vda of the differential amplifier circuit (4), which is obtained in advance under a condition where a rotational angular velocity is applied to the vibration gyro (31) in a driving state.

10 Claims, 9 Drawing Sheets

U.S. PATENT DOCUMENTS

| | | | |
|---|---|---|---|
| 5,854,428 A * | 12/1998 | Okaguchi | 73/504.12 |
| 6,016,698 A * | 1/2000 | Kasanami et al. | 73/504.14 |
| 6,151,964 A * | 11/2000 | Nakajima | 73/504.13 |
| 6,450,030 B1 * | 9/2002 | Fujimoto | 73/504.04 |
| 6,608,425 B2 * | 8/2003 | Ebara et al. | 310/316.01 |
| 6,805,007 B2 * | 10/2004 | Fell et al. | 73/504.12 |
| 7,107,841 B2 * | 9/2006 | Mori | 73/504.12 |
| 7,292,021 B2 * | 11/2007 | Tsuruhara et al. | 324/76.15 |
| 7,296,467 B2 * | 11/2007 | Kawamura et al. | 73/504.12 |

FOREIGN PATENT DOCUMENTS

| | | |
|---|---|---|
| JP | 07-218269 | 8/1995 |
| JP | 08-178670 | 7/1996 |
| JP | 09-318362 | 12/1997 |
| JP | 2000-283767 | 10/2000 |
| JP | 2002-228153 | 8/2002 |
| JP | 2002-228453 | 8/2002 |

OTHER PUBLICATIONS

Japanese Office Action issued on Nov. 4, 2009 in connection with JP Application No. 2004-295983.

* cited by examiner

VIBRATION GYRO CIRCUITRY, VIBRATION GYRO UNIT, AND METHOD FOR DETECTING VIBRATION GYRO OUTPUT

TECHNICAL FIELD

The present invention relates to vibration gyro circuitry, vibration gyro units, and methods for detecting vibration gyro outputs, for detecting a signal corresponding to a Coriolis force generated when a rotational angular velocity is applied to a vibrator in a vibrating state so as to detect the applied rotational angular velocity. In particular, the present invention relates to vibration gyro circuitry, a vibration gyro unit, and a method for detecting a vibration gyro output, in which a detection timing for a signal corresponding to a Coriolis force is optimally set in accordance with a characteristic of a vibration gyro.

BACKGROUND ART

Gyros are known as sensors for detecting rotational angular velocities. In particular, a type of gyro which uses a vibrator is referred to as a vibration gyro and widely used for a variety of applications, such as detection of unintentional hand shaking applied to video cameras or digital still cameras, direction detection in car navigation systems, and attitude control of movable bodies such as vehicles.

Vibration gyros which have been put into practical use include a triangular-prism-shaped or quadrangular-prism-shaped vibrator to which a piezoelectric element is attached, and a column-shaped vibrator formed of a piezoelectric ceramic on which electrodes are printed (see, for example, Japanese Unexamined Patent Application Publication No. 2000-337883).

FIG. 13 shows an example of a configuration block diagram illustrating a known vibration gyro. A vibration gyro 31, composed of a vibrator 32 and piezoelectric elements 33a and 33b which are attached to the vibrator 32, is connected to vibration gyro circuitry. The vibration gyro circuitry includes an adding circuit 1, an oscillation circuit 2, a differential amplifier circuit 4, a synchronous detection circuit 5, a phase shift circuit 13, and a direct current amplifier circuit 6. The vibration gyro 31, the adding circuit 1, and the oscillation circuit 2 constitute a self-oscillation circuit 7a for causing self-oscillation of the vibration gyro 31 at a resonance frequency of bending vibration of the vibration gyro 31.

An output signal of the oscillation circuit 2 is input to the vibrator 32 and applied to the piezoelectric elements 33a and 33b through a conductive plate on the surface of the vibrator 32. An output signal of the piezoelectric element 33b and an output signal of the piezoelectric element 33a are input to the adding circuit 1 and added together. An output signal of the adding circuit 1 is input to the oscillation circuit 2 and the phase shift circuit 13.

The output signal of the piezoelectric element 33b and the output signal of the piezoelectric element 33a are also input to the differential amplifier circuit 4. The differential amplifier circuit 4 outputs a signal corresponding to a difference between the output signal of the piezoelectric element 33b and the output signal of the piezoelectric element 33a. The synchronous detection circuit 5 detects the output signal of the differential amplifier circuit 4 synchronously with a timing signal output from the phase shift circuit 13. The Direct current amplifier circuit 6 amplifies a direct current signal synchronously detected by the synchronous detection circuit 5.

The vibration circuit 31 is driven by the self-oscillation circuit 7a and performs bending vibration in an orthogonal direction with respect to the lengthwise direction thereof. When no rotational angular velocity is applied around the lengthwise central axis of the vibration gyro 31, a strain in the piezoelectric element 33b and a strain in the piezoelectric element 33a are generated in exactly the same manner. Thus, the output signal from the piezoelectric element 33b and the output signal from the piezoelectric element 33a are the same in amplitude and phase, thus resulting in an output of zero from the differential amplifier circuit 4.

When the vibration gyro 31 is applied with a rotational angular velocity around its lengthwise central axis while performing the bending vibration mentioned above, a Coriolis force is generated in a direction crossing at right angles to the lengthwise direction and the direction of the bending vibration. The generated Coriolis force causes a change in the bending vibration direction and a difference between outputs from two detection pieces (the piezoelectric element 33a and the piezoelectric element 33b). Thus, an output signal proportional to the output difference of the two detection pieces can be obtained from the differential amplifier circuit 4.

When a rotational angular velocity is applied, the piezoelectric element 33b outputs a signal in which an output signal corresponding to a drive signal supplied to the vibration gyro 31 and an output signal corresponding to the Coriolis force are superimposed. Likewise, when a rotational angular velocity is applied, the piezoelectric element 33a outputs a signal in which an output signal corresponding to the drive signal supplied to the vibration gyro 31 and an output signal corresponding to the Coriolis force are superimposed.

The output signals of the piezoelectric element 33b and the piezoelectric element 33a corresponding to the drive signal are equal in phase and magnitude, and thus cancel each other in the differential amplifier circuit 4. On the contrary, the output signals of the piezoelectric element 33b and the piezoelectric element 33a corresponding to the Coriolis force are opposite in phase and equal in magnitude. Thus, the output signal of the differential amplifier circuit 4 is proportional to the difference between the output signal of the piezoelectric element 33b and the output signal of the piezoelectric element 33a, and only a signal corresponding to the magnitude of the rotational angular velocity is output from the differential amplifier circuit 4. The drive signal for driving the vibration gyro 31 and the output signal of the adding circuit 1 are in-phase and proportional in amplitude.

A Coriolis force develops in an orthogonal direction with respect to the direction of bending vibration corresponding to a drive signal. Therefore, a signal output from the differential amplifier circuit 4 corresponding to the Coriolis force, in principle, becomes zero at the maximum amplitude point of an output signal of the adding circuit 1 which is correlated (in-phase) with the drive signal, and becomes a maximum at the zero crossing point of the output signal of the adding circuit 1. This indicates that the output signal of the differential amplifier circuit 4 and the output signal of the adding circuit 1 are phase-shifted by 90 degrees. Accordingly, the synchronous detection circuit 5 is to detect the output signal of the differential amplifier circuit 4 at a timing of an output signal of the phase shift circuit 13 which has a phase difference of 90 degrees with respect to the output signal of the adding circuit 1.

DISCLOSURE OF INVENTION

In known techniques, signal processing is performed in accordance with a precondition that an output signal of the differential amplifier circuit 4 has a phase difference of 90 degrees with respect to an output signal of the adding circuit 1. However, the phase difference between the output signal of the adding circuit 1 and the output signal of the differential amplifier circuit 4 may not necessarily be 90 degrees, due to factors attributable to the structure, material, and size of the vibration gyro 31. Therefore, in a vibration gyro having such a characteristic that the phase difference is other than 90 degrees, if the output signal of the differential amplifier circuit 4 is detected synchronously with a timing signal of the phase shift circuit 13 which is phase-shifted by 90 degrees from the output signal of the adding circuit 1, a detection sensitivity for the output signal of the differential amplifier circuit 4, i.e., the sensitivity of detection of a rotational angular velocity, cannot be maximized. In addition, since a noise does not vary significantly with the structure, material and size of the vibration gyro, an S/N ratio in detecting the rotational angular velocity is decreased.

The present invention has been made in view of the drawback described above. Accordingly, there is a need for vibration gyro circuitry, a vibration gyro unit, and a method for detecting a vibration gyro output, which enables detection of a rotational angular velocity with high sensitivity.

To this end, the present invention employs a configuration as described below. Specifically, vibration gyro circuitry according to the present invention includes a differential amplifier circuit for outputting a signal corresponding to a difference between output signals of two detection pieces of a vibration gyro, a synchronous detection circuit for performing synchronous detection on the output signal of the differential amplifier circuit, and a phase shift circuit for supplying to the synchronous detection circuit a signal, as a timing signal for the synchronous detection, which is phase-shifted with respect to a drive signal supplied to the vibration gyro. The phase difference between the drive signal and the timing signal is set on the basis of a phase difference characteristic of a detection sensitivity for the output signal of the differential amplifier circuit. The phase difference characteristic is obtained in advance under a condition where a rotational angular velocity is applied to the vibration gyro in a driving state.

A vibration gyro unit according to the present invention includes a vibration gyro having two detection pieces, a differential amplifier circuit for outputting a signal corresponding to a difference between output signals of the detection pieces, a synchronous detection circuit for performing synchronous detection on the output signal of the differential amplifier circuit, and a phase shift circuit for supplying to the synchronous detection circuit a signal, as a timing signal for the synchronous detection, which is phase-shifted with respect to a drive signal supplied to the vibration gyro. The phase difference between the drive signal and the timing signal is set on the basis of a phase difference characteristic of a detection sensitivity for the output signal of the differential amplifier circuit. The phase difference characteristic is obtained in advance under a condition where a rotational angular velocity is applied to the vibration gyro in a driving state.

The difference between the output signals of the two detection pieces of the vibration gyro is zero, under a condition where no rotational angular velocity is applied to the vibration gyro. When a rotational angular velocity is applied to the vibration gyro, the difference between the output signals of the two detection pieces of the vibration gyro has a value corresponding to the applied rotational angular velocity. Thus, the output of the differential amplifier circuit is zero under the condition where no rotational angular velocity is applied to the vibration gyro, and when a rotational angular velocity is applied the output of the differential amplifier circuit has a value corresponding to the applied rotational angular velocity. The output signal of the differential amplifier circuit is an alternating current signal. The synchronous detection circuit synchronously detects the output signal of the differential amplifier circuit and rectifies the output signal into a direct current. The phase shift circuit produces a timing signal for the synchronous detection. The output signal of the differential amplifier circuit is rectified in synchronization with the timing signal.

The timing signal is phase-shifted with respect to the drive signal supplied to the vibration gyro. The amount of the phase shift (phase difference between the drive signal and the timing signal) is set on the basis of a phase difference characteristic of a detection sensitivity for the output signal of the differential amplifier circuit, which is obtained in advance under a condition where a rotational angular velocity is applied to the vibration gyro in a driving state. The detection sensitivity for the output signal of the differential amplifier circuit refers to the magnitude of the direct current signal obtained after the rectification of the output signal of the differential amplifier circuit and corresponds to a detection sensitivity for the rotational angular velocity applied to the vibration gyro. More specifically, in the present invention, the phase difference is variously changed, so that the relationship between each changed phase difference and the detection sensitivity for the rotational angular velocity is obtained in advance. On the basis of the obtained relationship, the phase difference that brings about high sensitivity is set as a set value. The phase difference is not fixed to 90 degrees as in known techniques, but an optimum phase difference can be set to conform with the characteristics of the vibration gyro, enabling detection of a rotational angular velocity with high sensitivity.

In addition, the phase shift circuit can be configured to include an integrating circuit for causing an input drive signal to be delayed by a phase difference determined by the time constants of a resistor and a capacitor. With this configuration, a desired phase difference can readily be set by adjustment of the resistance of the resistor (including adjustment of the resistance by changing the number of stages of the resistor) or by adjustment of the capacitance of the capacitor (including adjustment of the capacitor by changing the number of stages of the capacitor). This configuration also facilitates circuit design, realizing a phase shift circuit that is provided with the function described above at a reduced cost.

In a method for detecting a vibration gyro output according to the present invention, an output signal, which corresponds to a difference between output signals of two detection pieces of a vibration gyro, is detected synchronously with a timing signal which is phase-shifted with respect to a drive signal supplied to the vibration gyro, so that a rotational angular velocity applied to the vibration gyro is detected. The phase difference between the drive signal supplied to the vibration gyro and the timing signal which is phase-shifted with respect to the drive signal is set on the basis of a phase difference characteristic of the detection sensitivity for the signal corresponding to the difference between the output signals of the two detection pieces of the vibration gyro. The detection sensitivity is obtained in advance under the condition where a rotational angular velocity is applied to the vibration gyro in a driving state. The signal corresponding to the difference between the output signals of the two detection pieces is detected synchronously with the timing signal that is phase-shifted by the set phase difference with respect to the drive signal.

The difference between the output signals of the two detection pieces of the vibration gyro is zero, under a condition where no rotational angular velocity is applied to the vibration gyro. When a rotational angular velocity is applied to the vibration gyro, the difference between the outputs of the two detection pieces of the vibration gyro has a value corresponding to the applied rotational angular velocity. Thus, the signal corresponding to the difference between the output signals of the detection pieces is zero, under the condition where no rotational angular velocity is applied, and when a rotational angular velocity is applied, the signal has a value corresponding to the applied rotational angular velocity. The signal corresponding to the difference between the output signals of the detection pieces is an alternating current signal. This signal is detected in synchronization with the timing signal that is phase-shifted with respect to the drive signal supplied to the vibration gyro and rectified into a direct current.

The amount of the phase shift (phase difference between the drive signal and the timing signal) is set on the basis of a phase difference characteristic of detection sensitivity for the signal corresponding to the output signals of the detection pieces. The phase difference characteristic is obtained in advance under a condition where a rotational angular velocity is applied to the vibration gyro in a driving state. The detection sensitivity for the signal corresponding to the difference between the output signals of the detection pieces refers to the magnitude of the direct current signal obtained after the rectification of the signal corresponding to the difference between the output signals of the detection pieces. The detection sensitivity corresponds to a detection sensitivity for the rotational angular velocity applied to the vibration gyro. More specifically, in the present invention, the phase difference is variously changed, so that the relationship between each changed phase difference and the detection sensitivity for the rotational angular velocity is obtained in advance. On the basis of the obtained relationship, the phase difference that brings about a high sensitivity is set as a set value. The phase difference is not fixed to 90 degrees as in known techniques, but an optimum phase difference can be set to conform with a characteristic of a vibration gyro, enabling detection of a rotational angular velocity with high sensitivity.

BEST MODE FOR CARRYING OUT THE INVENTION

In the following, exemplary embodiments to which the present invention is applied will be described in detail with reference to the accompanying drawings. However, the present invention is not limited to the following embodiments, and various modifications can be made on the basis of the technical concept of the present invention.

First Embodiment

Figure 2:
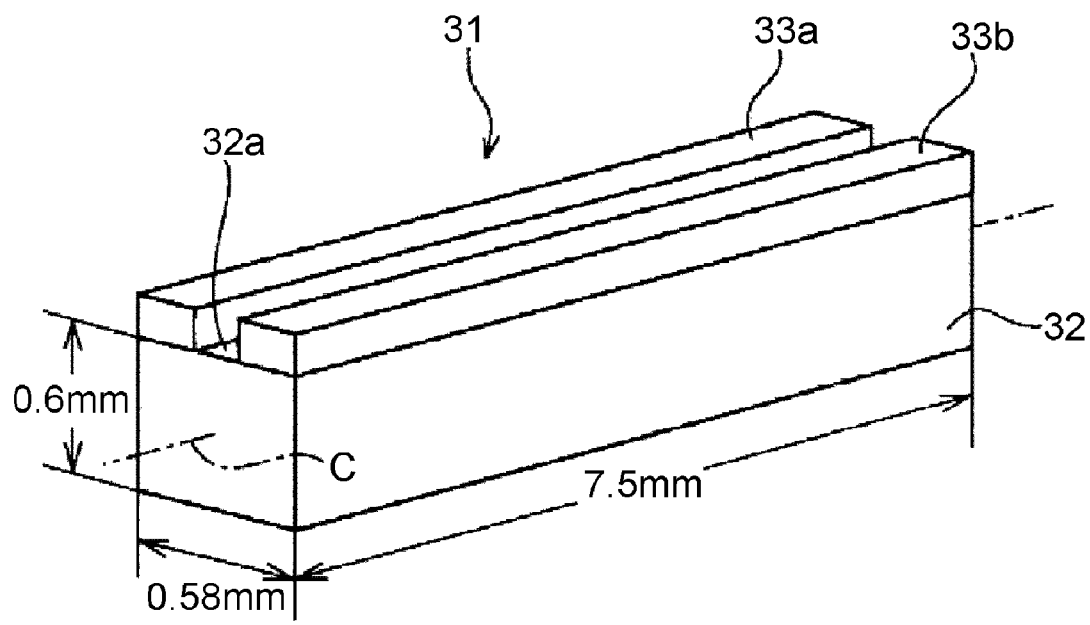
FIG. 2 is a perspective view of the vibration gyro shown in FIG. 1.
Figure 3:
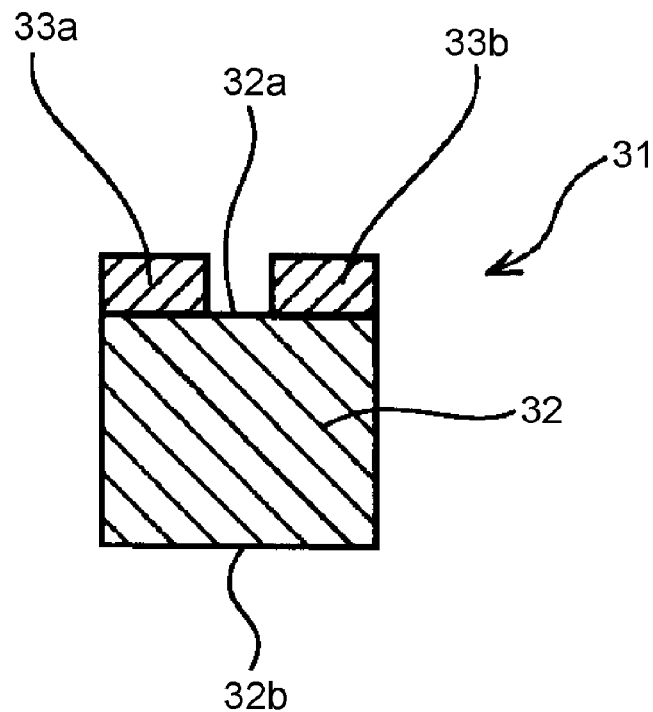
FIG. 3 is a sectional view of the vibration gyro.

FIG. 2 is a perspective view of a vibration gyro 31 according to a first embodiment of the present invention, and FIG. 3 is a sectional view of the vibration gyro 31. The vibration gyro 31 is composed of a quadrangular-prism-shaped vibrator 32 having a conductive material plated on a surface thereof and two piezoelectric elements 33a and 33b which are attached to a first side face 32a of the vibrator 32. The piezoelectric elements 33a and 33b serve as driving pieces for supplying a drive signal to the vibration gyro 31 and also as detection pieces for detecting a signal corresponding to a rotational angular velocity applied to the vibration gyro 31.

The vibrator 32 is formed of a material that can generate mechanical bending vibration, such as amorphous carbon, elinvar, Fe—Ni alloy, quartz, glass, crystal, ceramics, etc. Each of the two piezoelectric elements 33a and 33b, formed in a shape of a quadrangular prism having a length identical to the length of the vibrator 32, extends along the lengthwise direction of the vibrator 32 and opposes the other piezoelectric element forming a gap therebetween. The piezoelectric element 33a and the piezoelectric element 33b are symmetrical with respect to a center line bisecting the first side face 32a in a widthwise direction.

Figure 1:
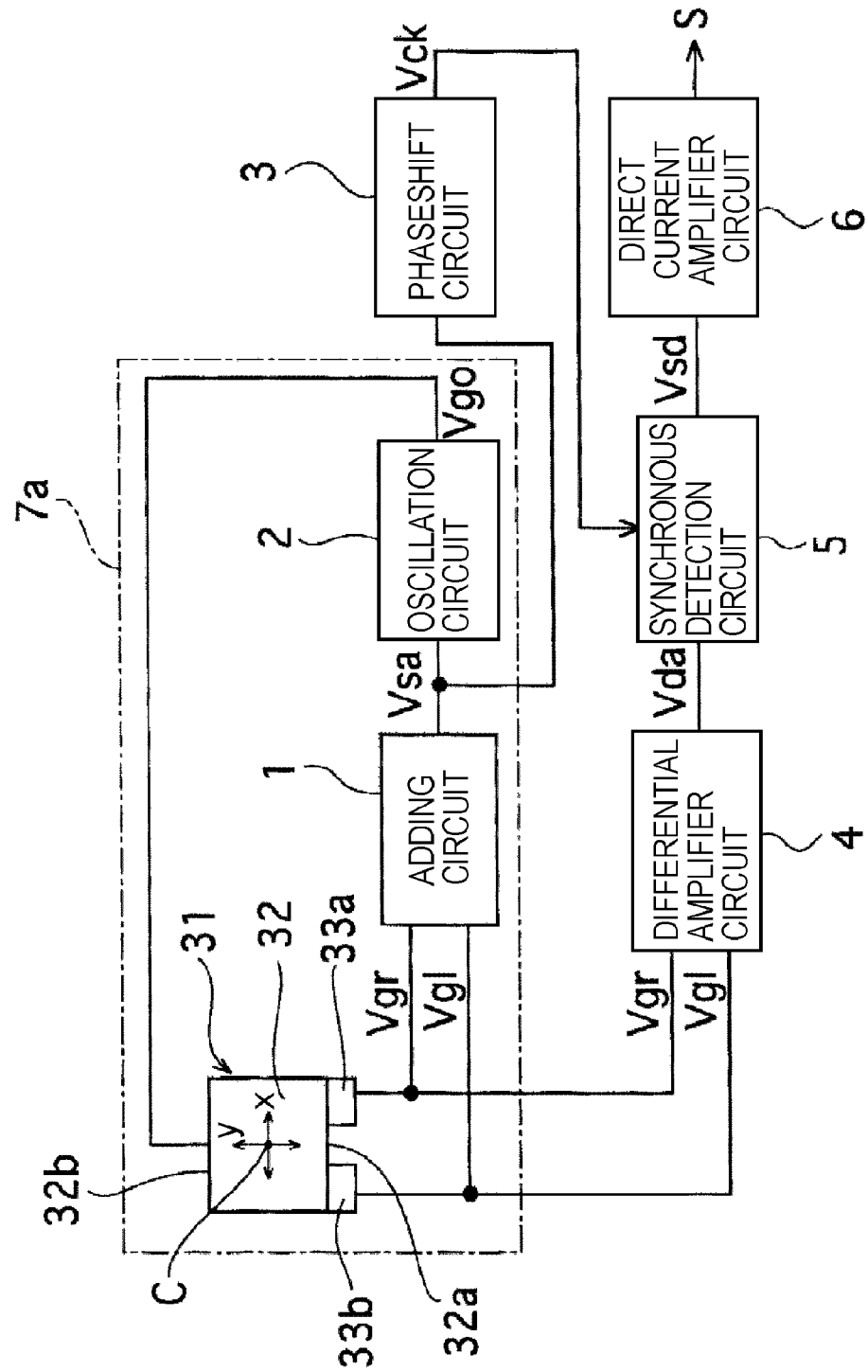
FIG. 1 is a block diagram illustrating a configuration of a vibration gyro unit according to a first embodiment of the present invention.

The vibration gyro 31 is connected to vibration gyro circuitry. This circuitry and the vibration gyro 31 constitute a vibration gyro unit. As shown in FIG. 1, the vibration gyro circuitry includes an adding circuit 1, an oscillation circuit 2, a differential amplifier circuit 4, a synchronous detection circuit 5, a phase shift circuit 3, and a direct current amplifier circuit 6. The vibration gyro 31, the adding circuit 1, and the oscillation circuit 2 constitute a self-oscillation circuit 7a for causing self-oscillation of the vibration gyro 31 at a resonance frequency of bending vibration of the vibration gyro 31. The vibration gyro circuitry is formed on an IC (integrated circuit) using one semiconductor chip, for example. The semiconductor chip is implemented on a circuit board in a form of a bare chip or a package. This circuit board is also mounted with the vibration gyro 31, constituting the vibration gyro unit.

An output signal Vgo of the oscillation circuit 2 is input to a second side face 32b opposed to the first side face 32a of the vibrator 32 and is applied through the conductive plate on the surface of the vibrator 32 to the piezoelectric elements 33a and 33b attached on the first side face 32a. An output signal Vgl of the piezoelectric element 33b and an output signal Vgr of the piezoelectric element 33a are input to the adding circuit 1 and added together. An output signal Vsa of the adding circuit 1 is adjusted in amplitude and phase by the oscillation circuit 2 and supplied to the vibration gyro 31 as a drive signal. The output signal Vsa of the adding circuit 1 is also input to the phase shift circuit 3.

The output signal Vgl of the piezoelectric element 33b and the output signal Vgr of the piezoelectric element 33a are also input to the differential amplifier circuit 4. The differential amplifier circuit 4 outputs a signal Vda corresponding to a difference between the Vgl and Vgr. The signal Vda is detected by the synchronous detection circuit in synchronization with a timing signal Vck output from the phase shift circuit 3. The direct current amplifier circuit 6 amplifies a direct current signal Vsd synchronously detected by the synchronous detection circuit 5 and outputs a signal S.

Figure 4:
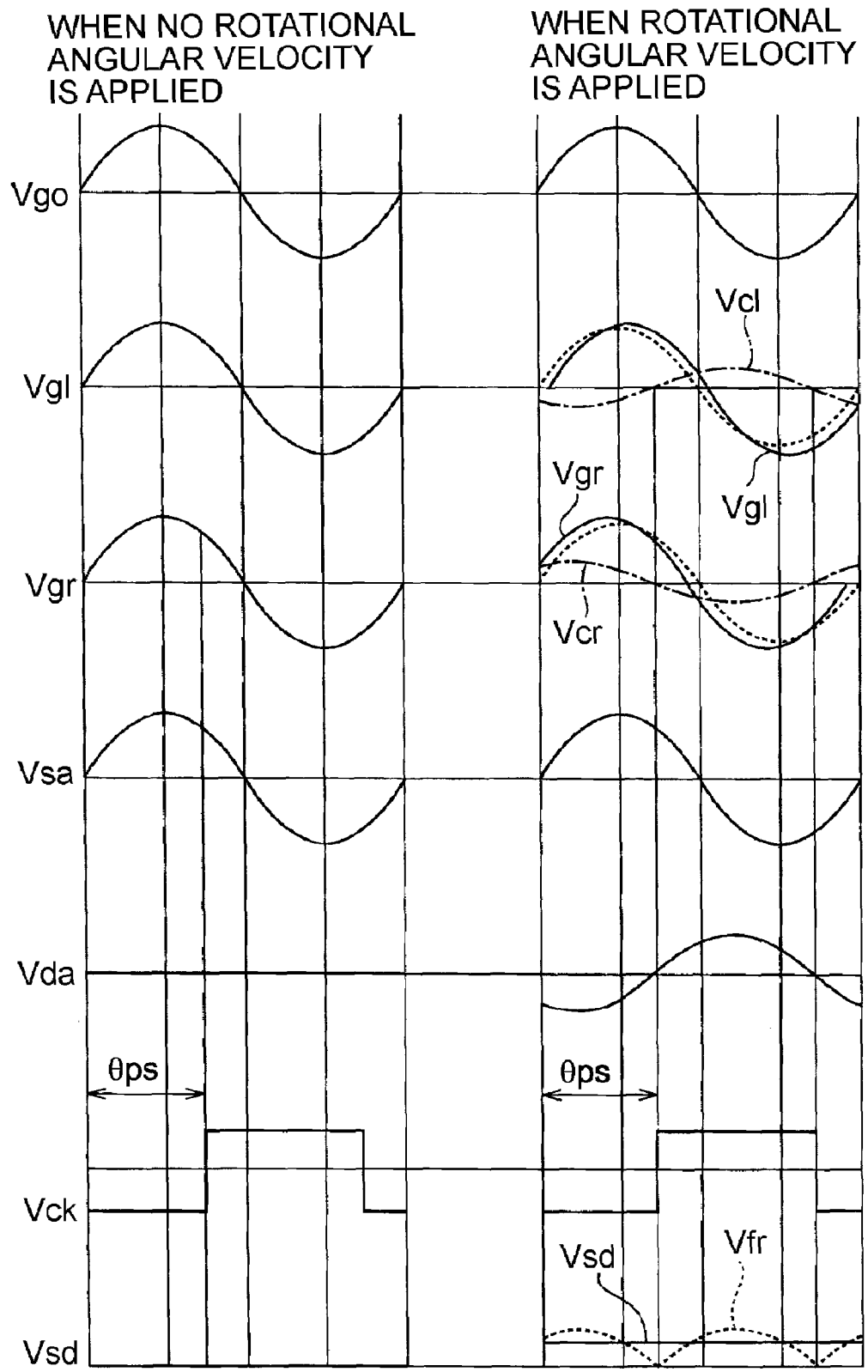
FIG. 4 is a time chart diagram illustrating a voltage waveform in each portion in the vibration gyro circuitry illustrated in FIG. 1.

FIG. 4 is a time chart diagram showing waveforms of the individual signals described above. The left side of the figure illustrates each signal waveform when no rotational angular velocity is applied to the vibration gyro 31. The right side illustrates each signal waveform when a rotational angular velocity is applied around a lengthwise central axis C (See FIG. 1) of the vibration gyro 31.

The vibration gyro 31 is driven by the self-oscillation circuit 7a and performs bending vibration in an orthogonal direction with respect to the first and second side faces 32a and 33b and to the lengthwise direction (y direction in FIG. 1). In a condition where no rotational angular velocity is applied around the lengthwise central axis C of the vibration gyro 31, a strain in the piezoelectric element 33b and a strain in the piezoelectric element 33a are generated in exactly the same manner. Thus, the output signal Vgl from the piezoelectric element 33b and the output signal Vgr from the piezoelectric element 33a are the same in amplitude and phase, resulting in an output of zero from the differential amplifier circuit 4.

When the vibration gyro 31 is applied with a rotational angular velocity around its lengthwise central axis C while performing the bending vibration in the y direction, a Coriolis force is generated in an x direction crossing at right angles to both of the lengthwise and y directions. This Coriolis force causes a change in the bending vibration direction and an output difference between the two detection pieces (piezoelectric elements) 33a and 33b.

More specifically, the output signal Vgl from the piezoelectric element 33b and the output signal Vgr from the piezoelectric element 33a produce a difference (Vgl−Vgr), and the output signal Vda which is proportional to the difference (Vgl−Vgr) can be obtained from the differential amplifier circuit 4.

When a rotational angular velocity is applied, the piezoelectric element 33b outputs the signal Vgl on which an output signal corresponding to the drive signal (shown as a broken line in FIG. 4) supplied to the vibration gyro 31 and an output signal Vcl corresponding to the Coriolis force (shown as a dotted-chain line in FIG. 4) are superimposed. Likewise, when a rotational angular velocity is applied, the piezoelectric element 33a outputs the signal Vgr on which an output signal corresponding to the drive signal (shown as a broken line in FIG. 4) supplied to the vibration gyro 31 and an output signal Vcr corresponding to the Coriolis force (shown as a dotted-chain line in FIG. 4) are superimposed.

The output signals of the piezoelectric element 33b and the piezoelectric element 33a corresponding to the drive signal are equal in phase and magnitude and thus cancel each other in the differential amplifier circuit 4. In contrast, the output signal Vcl of the piezoelectric element 33b and the output signal Vcr of the piezoelectric element 33a which correspond to the Coriolis force are opposite in phase and equal in magnitude. Therefore, the output signal Vda of the differential amplifier circuit 4 is proportional to (Vcl−Vcr), and only a signal corresponding to the magnitude of the rotational angular velocity is output from the differential amplifier circuit 4.

The output signal Vcl of the piezoelectric element 33b and the output signal Vcr of the piezoelectric element 33a which correspond to the Coriolis force are opposite in phase and equal in magnitude, and thus cancel each other in the adding circuit 1. Therefore, the vibration gyro 31 is supplied with a constant drive signal regardless of a generated Coriolis force. The drive signal and the output signal Vsa of the adding circuit 1 are in-phase and proportional in amplitude to each other.

The signal Vda output from the differential amplifier circuit 4 which corresponds to the Coriolis force, in principle, becomes zero at a maximum amplitude point of the drive signal for driving the vibration gyro 31, i.e. the maximum amplitude point of the output signal Vsa of the adding circuit 1 which is in-phase with the drive signal, and becomes a maximum at a zero crossing point of the output signal Vsa. This indicates that the output signal Vsa of the adding circuit 1 and the output signal Vda of the differential amplifier circuit 4 have a phase difference of 90 degrees.

However, the phase difference between the output signal Vsa of the adding circuit 1 and the output signal Vda of the differential amplifier circuit 4 may not necessarily be 90 degrees, due to factors attributable to the structure, material, and size of the vibration gyro 31. In an example shown in FIG. 4, a phase difference θps between the output signal Vsa of the adding circuit 1 and the output signal Vda of the differential amplifier circuit 4 is greater than 90 degrees.

Accordingly, in this embodiment, the amount of a phase shift of the timing signal Vck from the output signal Vsa of the adding circuit 1 is not fixed to 90 degrees, but is set in accordance with a phase difference which is actually generated between the Vsa and the Vda. Then, synchronous detection of the output signal Vda of the differential amplifier circuit 4 is carried out at a timing of the timing signal Vck which is phase-shifted by the set phase difference θps. This indicates that the phase shift circuit 3 produces the timing signal Vck in the shape of a square wave, which is phase-shifted by θps from the output signal Vsa of the adding circuit 1 and supplies to the synchronous detection circuit 5 the Vck as the timing signal for synchronous detection.

The synchronous detection circuit 5 performs full-wave rectification on the output signal Vda of the differential amplifier circuit 4 which is an alternating current signal, in synchronization with the timing signal Vck, so as to convert the Vda into a signal Vfr. Then, the synchronous detection circuit 5 integrates (or smoothes) the Vfr and outputs a direct current signal Vsd. Specifically, when the timing signal Vck is at a low level, a negative voltage of the output signal Vda of the differential amplifier circuit 4 is inverted to a positive voltage so as to allow addition of the two signals. Additionally, because of the full-wave rectification, a higher detection sensitivity for the signal Vda and thus a higher value of the signal Vsd can be obtained, compared to half-wave rectification.

The output signal Vsd of the synchronous detection circuit 5 has a polarity corresponding to the direction of the rotational angular velocity applied to the vibration gyro 31 and is proportional to the magnitude of the rotational angular velocity. The direct current amplifier circuit 6 performs direct current amplification on the signal Vsd to a predetermined magnitude and outputs the signal S.

Figure 5:
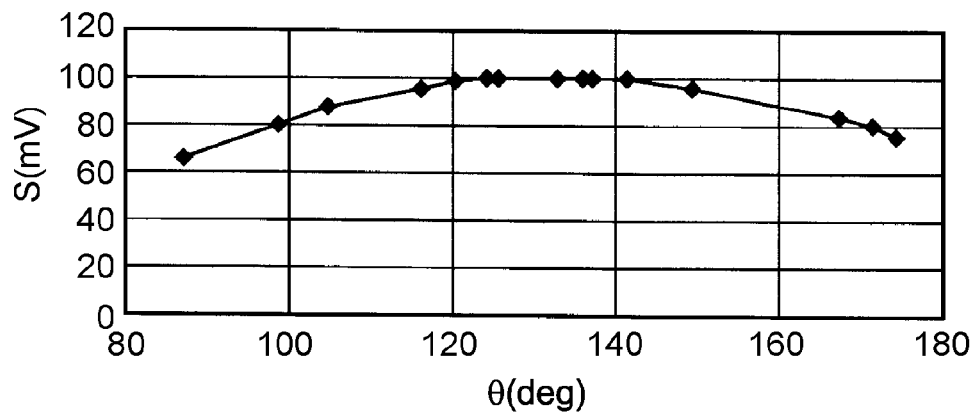
FIG. 5 is a graph illustrating an example of the relationship between a phase difference θ between a drive signal and a timing signal for synchronous detection, and a detection sensitivity S for a rotational angular velocity.

FIG. 5 illustrates an example of a phase difference characteristic of the detection sensitivity for the output signal Vda of the differential amplifier circuit 4, i.e., the detection sensitivity for a rotational angular velocity applied to the vibration gyro. The ordinate axis represents the magnitude of the output signal S of the direct current amplifier circuit 6 or the magnitude of the output signal Vsd of the synchronous detection circuit 5. The abscissa axis represents the amount of phase shift θ of the timing signal Vck with respect to the output signal Vsa of the adding circuit 1.

The characteristic shown in FIG. 5 illustrates the result of detection of rotational angular velocity using the vibration gyro 31 composed of the vibrator 32, formed of amorphous carbon, having a length of 7.5 mm, a width of 0.58 mm, and a thickness of 0.6 mm and the piezoelectric elements 33a and 33b formed of PZT, as shown in FIG. 2. In this detection, a rotational angular velocity is applied around the lengthwise central axis C, while the vibration gyro 31 is driven and thus performing the bending vibration in the y direction. Then, under this driving condition and the condition of the direction and magnitude of the applied rotational angular velocity, the phase shift amount θ of the timing signal Vck is variously changed and set for the detection of the rotational angular velocity.

As is apparent from FIG. 5, when the phase shift amount θ of the timing signal Vck with respect to the output signal Vsa of the adding circuit 1 ranges from 110 degrees to 150 degrees, high sensitivities (including a maximum sensitivity) can be achieved and the high sensitivities are stably maintained. Therefore, for the vibration gyro 31 having the characteristic shown in FIG. 5, the set value θps of the phase shift amount of the timing signal Vck with respect to the Vsa is arranged within the range of 110 degrees to 150 degrees. This enables an increase in the detection sensitivity for the output signal Vda of the differential amplifier circuit 4 that is detected in synchronization with the timing signal Vck, which consequently increases the detection sensitivity for the rotational angular velocity applied to the vibration gyro 31.

If the output signal Vda of the differential amplifier circuit 4 is synchronously detected with a timing signal corresponding to the phase shift θps which is fixed to 90 degrees, a direct current value of the signal Vda obtained after the full-wave rectification and integration is lowered, compared with the case where the synchronous detection is performed with the timing illustrated in FIG. 4. Consequently, as can be seen from the graph of FIG. 5, the value of the signal S, i.e., the detection sensitivity for a rotational angular velocity, is decreased. In this event, if a rotational angular velocity applied to a vibration gyro is low, it may be likely that the applied rotational angular velocity is mixed with noise and thus cannot be recognized. In addition, a Coriolis force is proportional to the mass of a vibration gyro. Therefore, since the output signal Vda of the differential amplifier circuit 4 is small, particularly in a miniaturized vibration gyro, detecting the signal Vda with a high sensitivity is important.

The characteristic shown in FIG. 5 is just one example, and may therefore vary if the structure, material, size, or the like of a vibration gyro is changed. It is obvious that for some vibration gyros, a maximum sensitivity can be achieved when a phase difference of the timing signal Vck with respect to a drive signal is 90 degrees or thereabout, in conformity with the principle. Also in this case, the phase difference θps can be set to 90 degrees on the basis of such a preobtained phase difference characteristic of the sensitivity S as shown in FIG. 5.

In the example shown in FIG. 4, the phase difference θps of the timing signal Vck with respect to the output signal Vsa of the adding circuit 1 is set so as to accord with the phase difference of the output signal Vsd of the differential amplifier circuit 4 with respect to the output signal Vsa of the adding circuit. However, these phase differences may not necessarily have to accord with each other. As can be seen from the characteristic diagram shown in FIG. 5, in the range of phase difference where the sensitivity level is kept constant at the maximum sensitivity, there is no or, if any, a negligible amount of difference in sensitivity attributable to a difference in phase difference. Therefore, it is desirable to set the phase difference θps to be within this range of phase difference.

Figure 6:
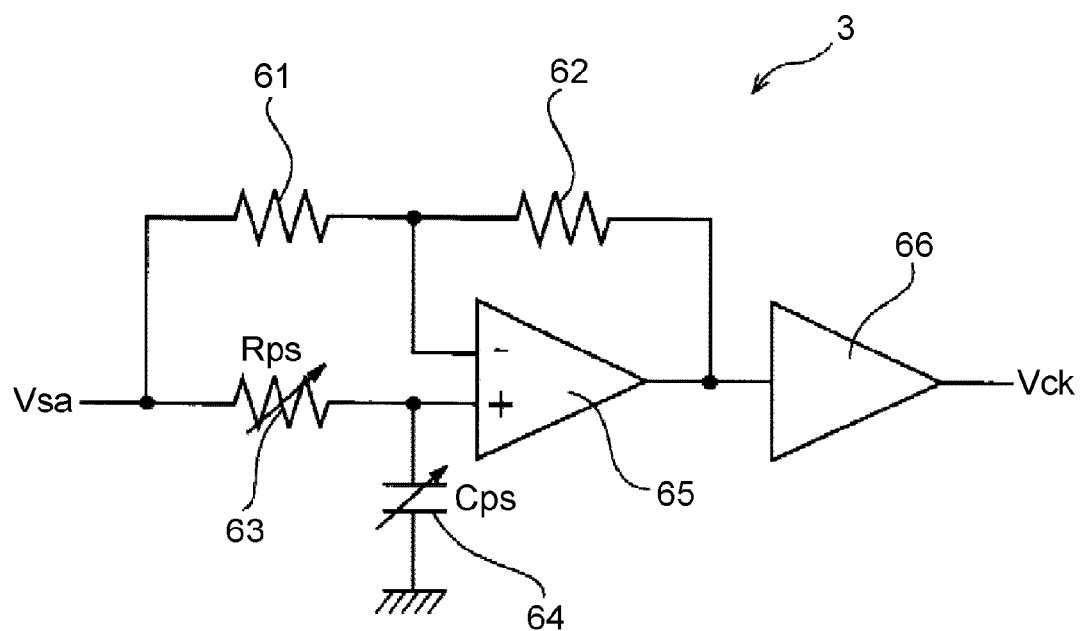
FIG. 6 is a circuit diagram illustrating an example of a phase shift circuit illustrated in FIG. 1.

FIG. 6 is a circuit diagram illustrating an example of the phase shift circuit 3. This phase shift circuit 3 has an integrating circuit composed of a resistor 63 and a capacitor 64, which serves as a delay circuit for applying a phase delay to the output signal Vsa of the adding circuit 1 to be input. One end of the resistor 63 is connected to an output side of the adding circuit 1, and the other end of the resistor 63 is connected to a positive input terminal of an operational amplifier 65. One end of the capacitor 64 is connected to the other end of the resistor 63 and the other end of the capacitor 64 is grounded. Two serially connected resistors 61 and 62 are connected between the one end of the resistor 63 and an output terminal of the operational amplifier 65. A negative input terminal of the operational amplifier 65 is connected between the resistor 61 and the resistor 62. The output terminal of the operational amplifier 65 is connected to an input terminal of a comparator 66.

The output signal Vsa passes through the integrating circuit composed of the resistor 63 and the capacitor 64 and then is input to the positive input terminal of the operational amplifier 65. Since the electric potential of the negative input terminal of the operational amplifier 65 is the electric potential at the positive input terminal, a voltage across the resistor 61 is thus a difference between the output of the integrating circuit and the output Vsa of the adding circuit 1. The current resulting from the voltage across the resistor 61 is supplied to the resistor 62, and the output voltage of the operational amplifier 65 is determined. This output of the operational amplifier 65 passes through the comparator 66, and thus the output signal (timing signal) Vck of the phase shift circuit 3 shown in FIG. 4 is obtained.

A resistance of the resistor 63 is herein represented as Rps, a capacitance of the capacitor 64 as Cps, and a frequency of the output signal Vsa of the adding circuit 1 as $f_0$. A resistance of the resistor 61 is herein supposed to be equal to a resistance of the resistor 62. Under this condition, a phase difference between the input and output of the phase shift circuit 3, i.e., the phase difference θps of the timing signal Vck with respect to the output signal of the adding circuit 1, is determined by the following formula (I):

$$\theta ps = 2 \cdot \tan^{-1}(2 \cdot \pi Rps \cdot Cps \cdot f_0) \qquad (1)$$

This indicates that the phase delay amount θps is determined by the time constants (Rps·Cps). Thus, a desired phase difference θps can be readily set by adjusting the resistance Rps of the resistor 63 or the capacitance Cps of the capacitor 64 (including adjustment of the number of stages of the resistor 63 and the capacitor 64).

The phase shift circuit 3 is not limited to one which uses a phase delay provided by a delay circuit (integrating circuit) and may be one which uses a phase lead provided by a phase lead circuit (differentiating circuit).

In recent years, with the miniaturization and cost reduction of apparatuses installed with a vibration gyro unit, there has been the need for miniaturization and cost reduction of such a vibration gyro. Vibration gyro circuitry is implemented on an integrated circuit using a semiconductor chip. In manufacturing such circuitry, firstly, before the stage of implementation on the integrated circuit, the relationship between a phase difference θ and a sensitivity S as illustrated in FIG. 5 is obtained. On the basis of the obtained relationship, the resistance Rps of the resistor 63 or the capacitance of the capacitor 64 is adjusted, so that the set value θps of phase difference that can bring about a high sensitivity is determined. Then, the determined set value θps is used for implementing the integrated circuit. The output of the integrated circuit is monitored using an oscilloscope for confirmation of proper setting.

In this confirmation, if it is found that the desired sensitivity has not been obtained, the θps is reset. For example, the resistor 63 has a configuration in which a multiple number of resistors are connected by a fuse. The θps is adjusted by adjusting the resistance Rps of the resistor 63 by cutting a selected part of the fuse by applying a laser or a high voltage to the part.

In determining the set value θps, such a characteristic diagram as shown in FIG. 5 is obtained for a plurality of vibration gyros, and then statistical data of these obtained characteristic diagrams is used for the determination. Alternatively, the set value θps may be determined using a characteristic diagram of one vibration gyro. Then the set value θps is applied in common among vibration gyros having an identical standard including the structure, size, material, manufacturing condition, etc.

Second Embodiment

A second embodiment of the present invention will now be described. The same symbol is assigned to the same component as that in the first embodiment, and the detailed description thereof will be omitted.

Figure 8:
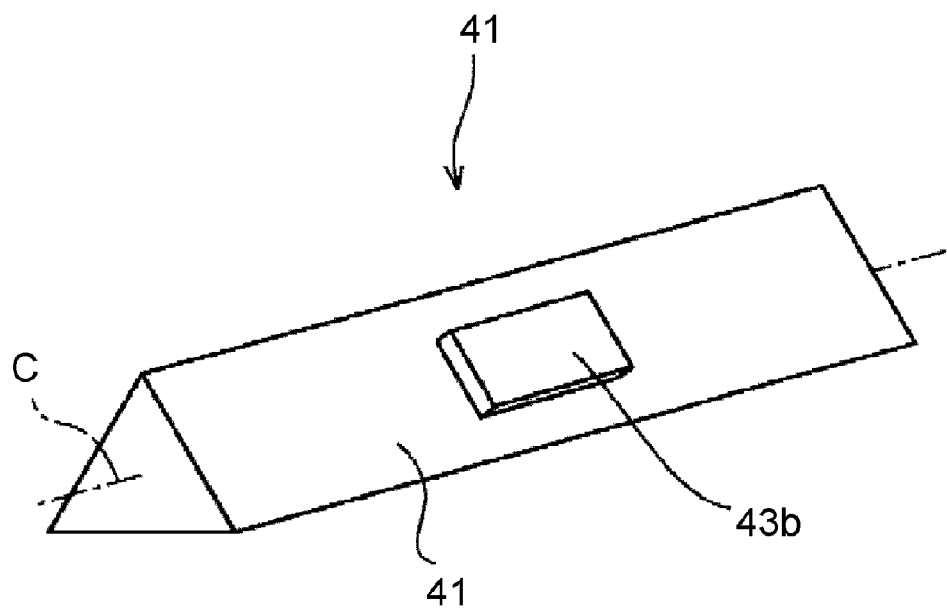
FIG. 8 is a perspective view of the vibration gyro shown in FIG. 7.
Figure 9:
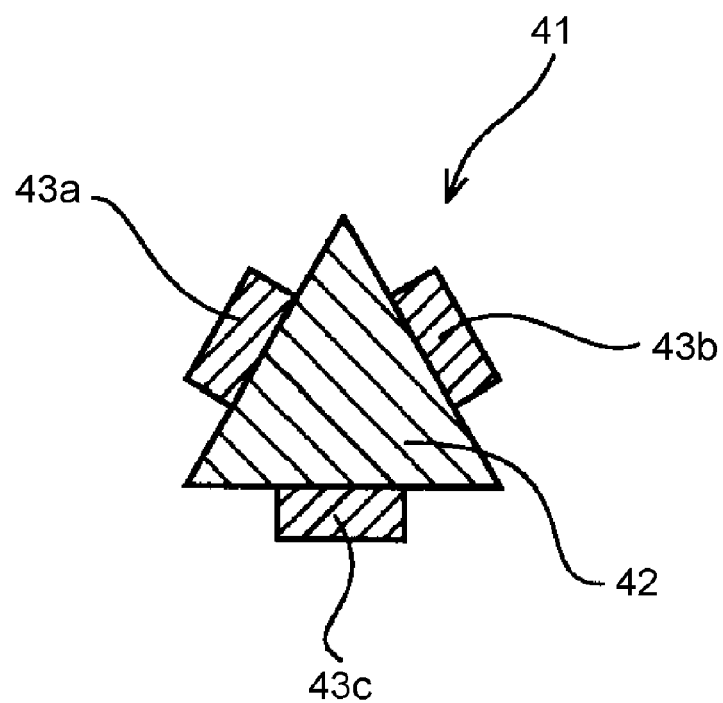
FIG. 9 is a sectional view of the vibration gyro.

A perspective view of a vibration gyro 41 according to the second embodiment of the present invention is shown in FIG. 8, and a sectional view of the vibration gyro 41 is shown in FIG. 9. The vibration gyro 41 is composed of a triangular-prism-shaped vibrator 42 having three piezoelectric elements 43a, 43b, and 43C each of which is attached to an individual side face of the vibrator 42. The piezoelectric elements 43c serves as a driving piece for supplying a drive signal to the vibration gyro 41. The piezoelectric elements 43a and 43b serve as detection pieces for detecting a signal corresponding to a rotational angular velocity applied to the vibration gyro 41.

The vibrator 42 is formed of a material that can generate mechanical bending vibration, such as amorphous carbon, elinvar, Fe—Ni alloy, quartz, glass, crystal, ceramics, etc. The three piezoelectric elements 43a to 43c, all having an identical shape (rectangular-prism shape) and size, are arranged symmetrically with respect to a lengthwise central axis of the vibrator 42.

Figure 7:
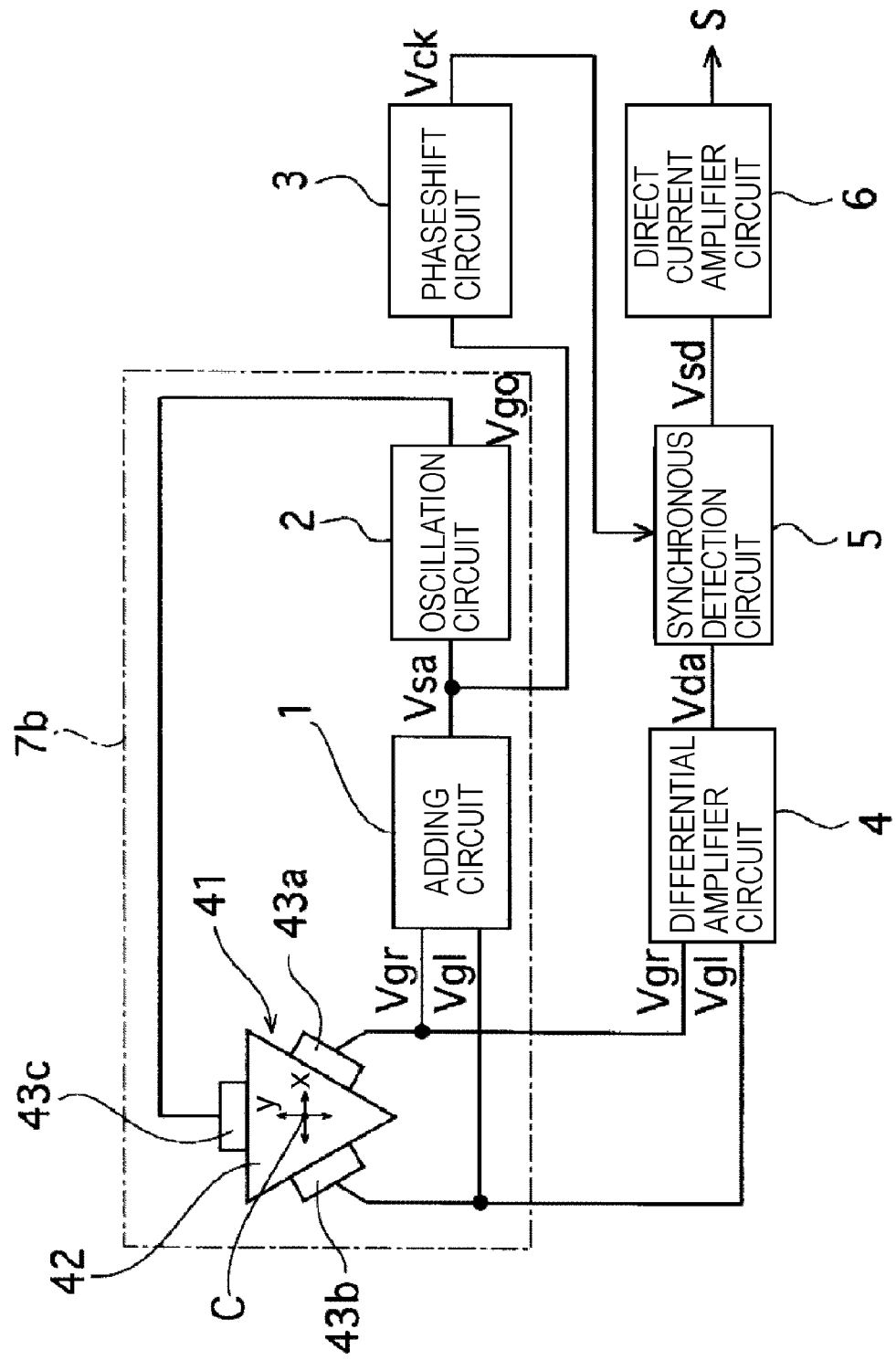
FIG. 7 is a block diagram illustrating a configuration of a vibration gyro unit according to a second embodiment of the present invention.

The vibration gyro 41 is connected to vibration gyro circuitry shown in FIG. 7. This circuitry and the vibration gyro 41 constitute a vibration gyro unit. Similarly to the first embodiment, the vibration gyro circuitry includes an adding circuit 1, an oscillation circuit 2, a differential amplifier circuit 4, a synchronous detection circuit 5, a phase shift circuit 3, and a Direct current amplifier circuit 6. The vibration gyro 41, the adding circuit 1, and the oscillation circuit 2 constitute a self-oscillation circuit 7b for causing self-oscillation of the vibration gyro 41 at a resonance frequency of bending vibration of the vibration gyro 41.

An output signal Vgo of the oscillation circuit 2 is applied to the piezoelectric elements 43c which is the driving piece. An output signal Vgl of the piezoelectric element 43b and an output signal Vgr of the piezoelectric element 43a are input to the adding circuit 1 and added together. An output signal Vsa of the adding circuit 1 is input to the oscillation circuit 2 and the phase shift circuit 3.

The output signal Vgl of the piezoelectric element 43b and the output signal Vgr of the piezoelectric element 43a are also input to the differential amplifier circuit 4. The differential amplifier circuit 4 outputs a signal Vda corresponding to a difference between the Vgl and Vgr. The signal Vda is detected by the synchronous detection circuit 5, in synchronization with a timing signal Vck output from the phase shift circuit 3. The Direct current amplifier circuit 6 amplifies a direct current signal Vsd synchronously detected by the synchronous detection circuit 5 and outputs a signal S.

The vibration gyro 41 is driven by the self-oscillation circuit 7b and performs bending vibration in an orthogonal direction with respect to a surface to which the piezoelectric element 43c is attached and to the lengthwise direction (y direction in FIG. 7). In a condition where no rotational angular velocity is applied to a lengthwise central axis C of the vibration gyro 41, a strain in the piezoelectric element 43b and a strain in the piezoelectric element 43a are generated in exactly the same manner. Thus, the output signal Vgl from the piezoelectric element 43b and the output signal Vgr from the piezoelectric element 43a are the same in amplitude and phase, thus resulting in an output of zero from the differential amplifier circuit 4.

When the vibration gyro 41 is applied with a rotational angular velocity around its lengthwise central axis C while performing the bending vibration in the y direction, a Coriolis force is generated in an x direction crossing at right angles to both of the lengthwise and y directions. This Coriolis force causes a change in the bending vibration direction and an output difference between the two detection pieces (piezoelectric elements) 43a and 43b.

More specifically, the output signal Vgl from the piezoelectric element 43b and the output signal Vgr from the piezoelectric element 43a produce the difference (Vgl−Vgr), and the output signal Vda which is proportional to the difference (Vgl−Vgr) can be obtained from the differential amplifier circuit 4.

When a rotational angular velocity is applied, the piezoelectric element 43b outputs the signal Vgl on which an output signal corresponding to the drive signal supplied to the vibration gyro 41 and an output signal Vcl corresponding to the Coriolis force are superimposed. Likewise, when a rotational angular velocity is applied, the piezoelectric element 43a outputs the signal Vgr on which an output signal corresponding to the drive signal supplied to the vibration gyro 41 and an output signal Vcr corresponding to the Coriolis force are superimposed.

The output signals of the piezoelectric element 43b and the piezoelectric element 43a corresponding to the drive signal are equal in phase and magnitude and thus cancel each other in the differential amplifier circuit 4. In contrast, the output signal Vcl of the piezoelectric element 43b and the output signal Vcr of the piezoelectric element 43a which correspond to the Coriolis force are opposite in phase and equal in magnitude. Thus, the output signal Vda of the differential amplifier circuit 4 is proportional to (Vcl−Vcr), and only a signal corresponding to the magnitude of the rotational angular velocity is output from the differential amplifier circuit 4.

Since the output signal Vcl of the piezoelectric element 43b and the output signal Vcr of the piezoelectric element 43a which correspond to the Coriolis force are opposite in phase and equal in magnitude, and thus cancel each other in the adding circuit 1. Therefore, the vibration gyro 41 is supplied with a constant drive signal regardless of a Coriolis force to be generated. The drive signal and the output signal Vsa of the adding circuit 1 are in-phase and proportional in amplitude to each other.

In the second embodiment, similarly to the first embodiment, the amount of a phase shift of the timing signal Vck from the output signal Vsa of the adding circuit 1 is set in accordance with a phase difference which is actually generated between the Vsa and the Vda. Then, synchronous detection of the output signal Vda of the differential amplifier circuit 4 is carried out at a timing of the timing signal Vck which is phase-shifted by the set phase difference θps from the output signal Vsa of the adding circuit 1. This indicates that the phase shift circuit 3 produces the timing signal Vck in a shape of a square wave which is phase-shifted by θps from the output signal Vsa of the adding circuit 1 and supplies the Vck to the synchronous detection circuit 5 as the timing signal for synchronous detection.

The synchronous detection circuit 5 performs full-wave rectification on the output signal Vda, which is an alternating current signal, of the differential amplifier circuit 4, in synchronization with the timing signal Vck, so as to convert the Vda into a signal Vfr. Then, the synchronous detection circuit 5 integrates (or smoothes) the Vfr and outputs a direct current signal Vsd. This signal Vsd has a polarity corresponding to a direction of the rotational angular velocity applied to the vibration gyro 41 and is proportional to the magnitude of the applied rotational angular velocity. The direct current amplifier circuit 6 amplifies the signal Vsd to a predetermined magnitude and outputs a signal S.

Also in this embodiment, the relationship between a detection sensitivity for the output signal Vda of the differential amplifier circuit 4, i.e., the detection sensitivity for the rotational angular velocity applied to the vibration gyro 41, and an amount of the phase difference θ of the timing signal Vck with respect to the output signal Vsa of the adding circuit 1 is obtained in advance. On the basis of the obtained relationship, the phase difference θps is set. Therefore, the output signal Vda of the differential amplifier circuit 4 is synchronously detected with the timing signal Vck whose phase shift amount is set to be θps with respect to the output signal Vsa of the adding circuit 1. This can increase the detection sensitivity for the output signal Vda, which consequently increases the detection sensitivity for the rotational angular velocity applied to the vibration gyro 41.

Third Embodiment

A third embodiment of the present invention will now be described. The same symbol is assigned to the same component as that in the first embodiment, and the detailed description thereof will be omitted.

Figure 11:
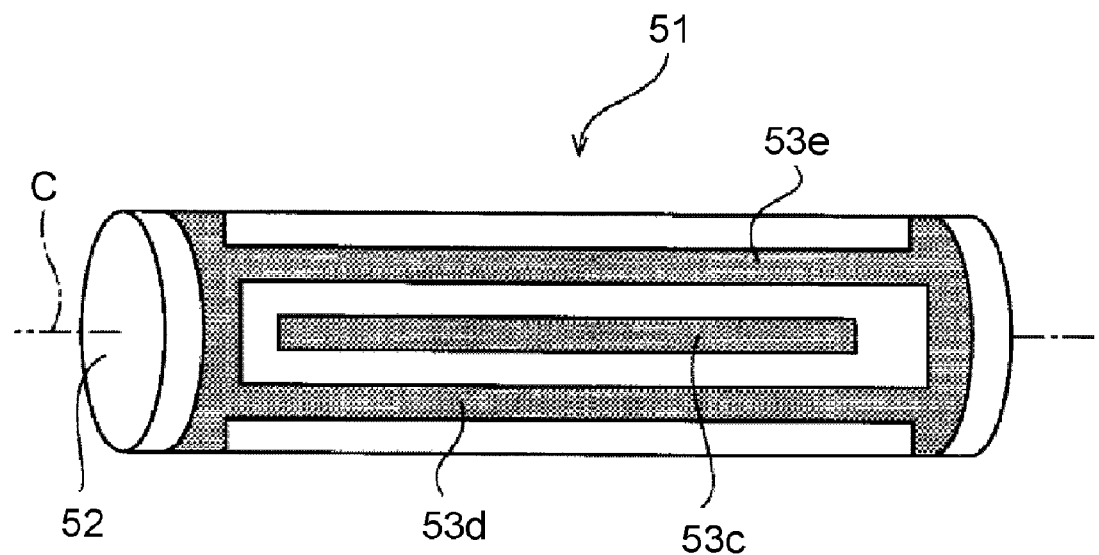
FIG. 11 is a perspective view of the vibration gyro shown in FIG. 10.
Figure 12:
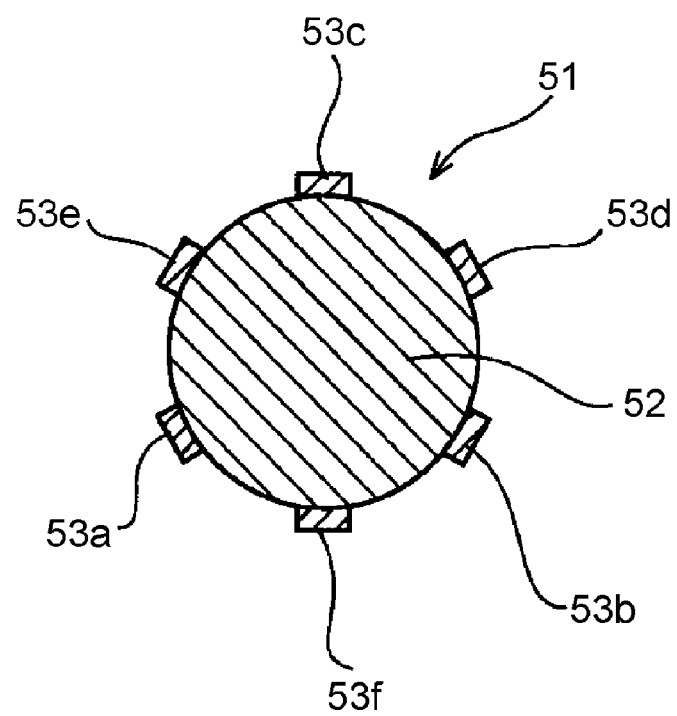
FIG. 12 is a sectional view of the vibration gyro.
Figure 13:
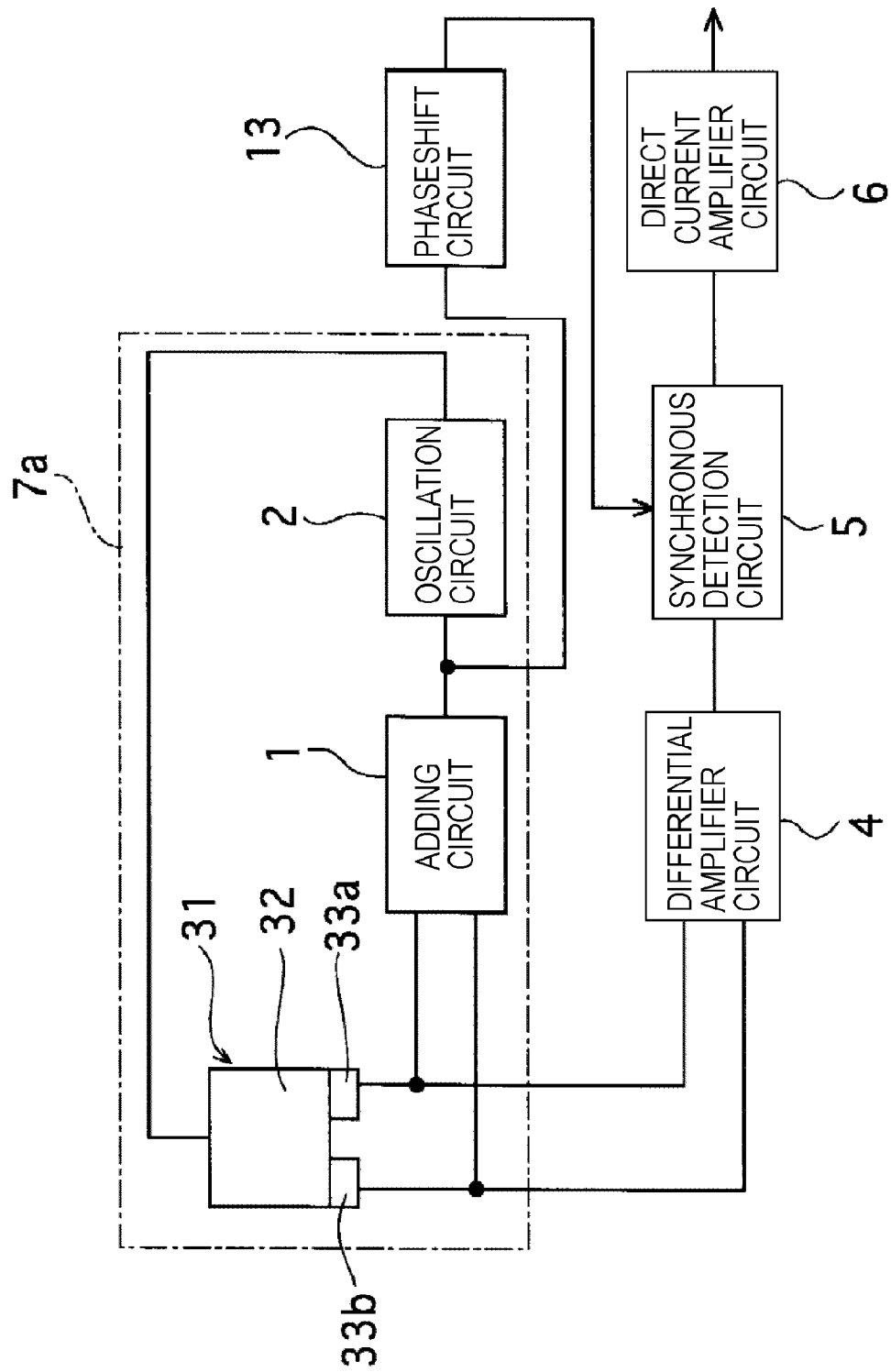
FIG. 13 is a block diagram illustrating an example of a configuration of a known vibration gyro.

A perspective view of a vibration gyro 51 according to the third embodiment of the present invention is shown in FIG. 11, and a sectional view of the vibration gyro 51 is shown in FIG. 12. The vibration gyro 51 is composed of a cylindrical shaped vibrator 52 and electrodes 53a to 53f formed on a peripheral surface of the vibrator 52. Each of the electrodes 53a, 53b, and 53c is adapted to be independent, and the electrodes 53d to 53f are connected to a common ground. The electrode 53c serves as a driving piece for supplying a drive signal to the vibration gyro 51. The electrode 53a and 53b serve as detection pieces for detecting a rotational angular velocity applied to the vibration gyro 51.

The vibrator 52 is formed of a piezoelectric material such as piezoelectric ceramics. Every one of the electrodes 53a to 53f is placed parallel to the lengthwise direction of the vibrator 52. The electrodes 53a to 53f are located at six equally spaced positions around the circumference of a cross-section of the vibrator 52.

Figure 10:
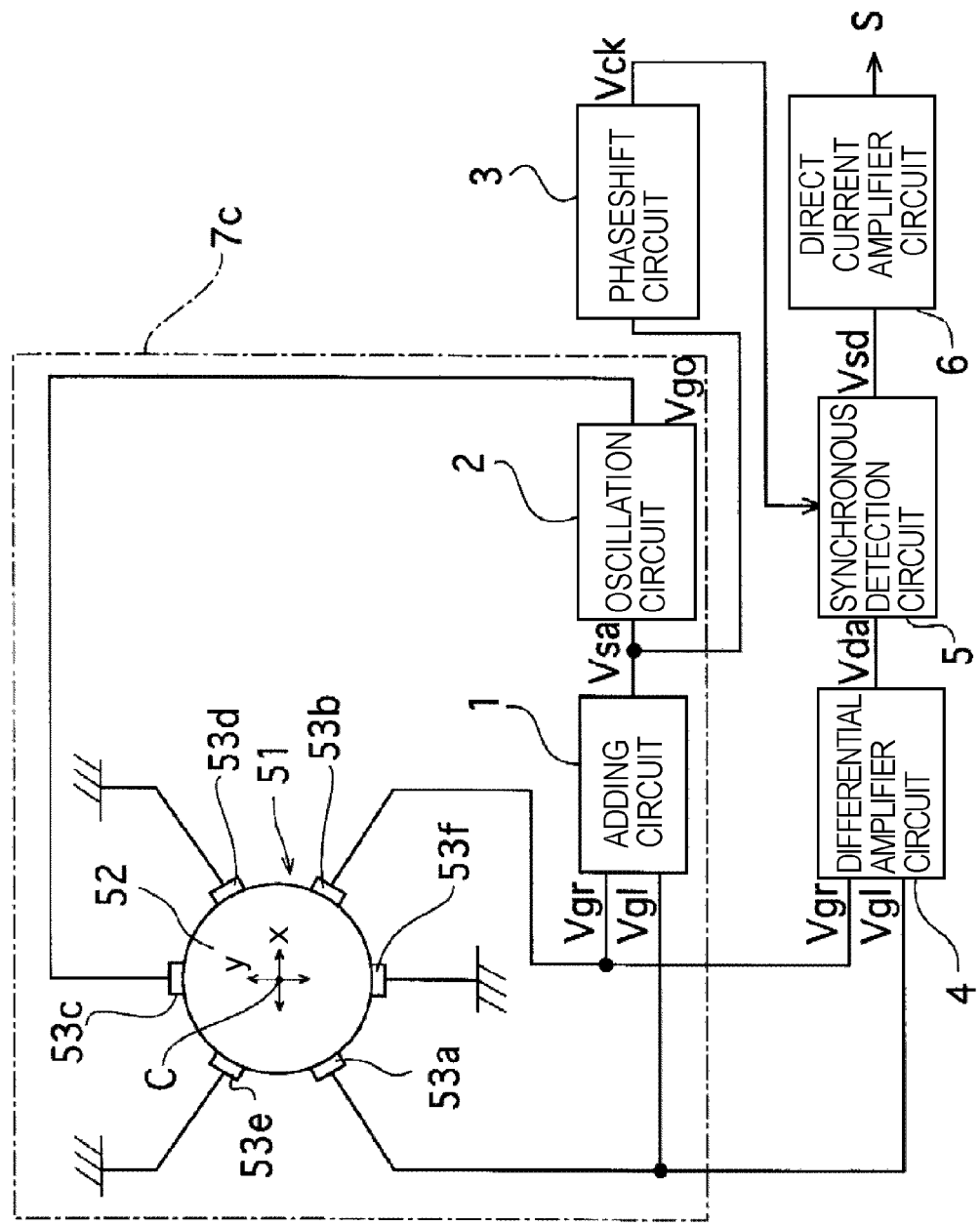
FIG. 10 is a block diagram illustrating a configuration of a vibration gyro unit according to a third embodiment of the present invention.

The vibration gyro 51 is connected to vibration gyro circuitry as shown in FIG. 10. This circuitry and the vibration gyro 51 constitute a vibration gyro unit according to the third embodiment of the present invention. Similarly to the first embodiment, the vibration gyro circuitry includes an adding circuit 1, an oscillation circuit 2, a differential amplifier circuit 4, a synchronous detection circuit 5, a phase shift circuit 3, and a Direct current amplifier circuit 6. The vibration gyro 51, the adding circuit 1, and the oscillation circuit 2 constitute a self-oscillation circuit 7c for causing self-oscillation of the vibration gyro 51 at a resonance frequency of bending vibration of the vibration gyro 51.

An output signal Vgo of the oscillation circuit 2 is applied to the electrode 53c which is the driving piece. An output signal Vgl of the electrode 53a and an output signal Vgr of the electrode 53b are input to the adding circuit 1 and added together. An output signal Vsa of the adding circuit 1 is input to the oscillation circuit 2 and the phase shift circuit 3.

The output signal Vgl of the electrode 53a and the output signal Vgr of the electrode 53b are also input to the differential amplifier circuit 4. The differential amplifier circuit 4 outputs a signal Vda corresponding to a difference between the Vgl and Vgr. The signal Vda is detected by the synchronous detection circuit 5, in synchronization with a timing signal Vck output from the phase-shift circuit 3. The Direct current amplifier circuit 6 amplifies a direct current signal Vsd synchronously detected by the synchronous detection circuit 5 and outputs a signal S.

The vibration gyro 51 is driven by the self-oscillation circuit 7c and performs bending vibration in an orthogonal direction with respect to a surface of the electrode 53 and to the lengthwise direction (y direction in FIG. 10). In a condition where no rotational angular velocity is applied to a lengthwise central axis C of the vibration gyro 51, a strain in the electrode 53a and a strain in the electrode 53b are generated in exactly the same manner. Thus, the output signal Vgl from the electrode 53a and the output signal Vgr from the electrode 53b are the same in amplitude and phase, thus resulting in an output of zero from the differential amplifier circuit 4.

When the vibration gyro 51 is applied with a rotational angular velocity around its lengthwise central axis C while performing the bending vibration in the y direction, a Coriolis force is generated in an x direction crossing at right angles to both of the lengthwise and y directions. This Coriolis force causes a change in the bending vibration direction and an output difference between the two detection pieces (the electrodes 53a and 53b).

More specifically, the output signal Vgl from the electrode 53a and the output signal Vgr from the electrode 53b produce the difference (Vgl−Vgr), and the output signal Vda which is proportional to the difference (Vgl−Vgr) can be obtained from the differential amplifier circuit 4.

When a rotational angular velocity is applied, the electrode 53a outputs the signal Vgl on which an output signal in accordance the drive signal supplied to the vibration gyro 51 and an output signal Vcl corresponding to the Coriolis force are superimposed. Likewise, when a rotational angular velocity is applied, the electrode 53b outputs the signal Vgr on which an output signal corresponding to the drive signal supplied to the vibration gyro 51 and an output signal Vcr corresponding to the Coriolis force are superimposed.

The output signals of the electrode 53a and the electrode 53b corresponding to the drive signal are equal in phase and magnitude and thus cancel each other in the differential amplifier circuit 4. In contrast, the output signal Vcl of the electrode 53a and the output signal Vcr of the electrode 53b which correspond to the Coriolis force are opposite in phase and equal in magnitude. Thus, the output signal Vda of the differential amplifier circuit 4 is proportional to (Vcl−Vcr), and only a signal corresponding to the magnitude of the rotational angular velocity is output from the differential amplifier circuit 4.

Since the output signal Vcl of the piezoelectric element 53a and the output signal Vcr of the piezoelectric element 53b which correspond to the Coriolis force are opposite in phase and equal in magnitude, and thus cancel each other in the adding circuit 1. Therefore, the vibration gyro 51 is supplied with a constant drive signal regardless of a Coriolis force to be generated. The drive signal and the output signal Vsa of the adding circuit 1 are in-phase and proportional in amplitude to each other.

In the third embodiment, similarly to the first embodiment, the amount of a phase shift of the timing signal Vck from the output signal Vsa of the adding circuit 1 is set in accordance with a phase difference which is actually generated between the Vsa and the Vda. Then, synchronous detection of the output signal Vda of the differential amplifier circuit 4 is carried out at a timing of the timing signal Vck which is phase-shifted by the set phase difference θps from the output signal Vsa of the adding circuit 1. This indicates that the phase shift circuit 3 produces the timing signal Vck in a shape of a square wave which is phase-shifted by θps from the output signal Vsa of the adding circuit 1 and supplies the Vck to the synchronous detection circuit 5 as the timing signal for synchronous detection.

The synchronous detection circuit 5 performs full-wave rectification on the output signal Vda, which is an alternating current signal, of the differential amplifier circuit 4, in synchronization with the timing signal Vck, so as to convert the Vda into a signal Vfr. Then, the synchronous detection circuit 5 integrates (or smoothes) the Vfr and outputs a direct current signal Vsd. This signal Vsd has a polarity corresponding to a direction of the rotational angular velocity applied to the vibration gyro 51 and is proportional to the magnitude of the applied rotational angular velocity. The Direct current amplifier circuit 6 amplifies the signal Vsd to a predetermined magnitude and outputs a signal S.

Also in this embodiment, the relationship between a detection sensitivity for the output signal Vda of the differential amplifier circuit 4, i.e., the detection sensitivity for the rotational angular velocity applied to the vibration gyro 51, and an amount of the phase difference θ of the timing signal Vck with respect to the output signal Vsa of the adding circuit 1 is obtained in advance. On the basis of the obtained relationship, the phase difference amount θps is set. Therefore, synchronous detection of the output signal Vda of the differential amplifier circuit 4 is performed using the timing signal Vck whose phase shift amount is set to be θps with respect to the output signal Vsa of the adding circuit 1. This can increase the detection sensitivity for the output signal Vda, which consequently increases the detection sensitivity for the rotational angular velocity applied to the vibration gyro 51.

In each of the embodiments described above, the phase difference θps is provided as a phase difference of the timing signal Vck with respect to the output signal Vsa of the adding circuit 1. However, since the output signal Vgo of the oscillation circuit 2 and the output signal Vsa of the adding circuit 1 are in-phase and proportional in amplitude to each other, the phase difference θps may be a phase difference of the Vck with respect to the output signal Vgo of the oscillation circuit 2.

INDUSTRIAL APPLICABILITY

Vibration gyro circuitry according to the present invention, a phase difference of a timing signal for synchronous detection with respect to a driving signal is set on the basis of a phase difference characteristic of a detection sensitivity for an output signal of a differential amplifier circuit. This phase difference characteristic is obtained in advance under a condition where a rotational angular velocity is applied to a vibration gyro in a driving state. Accordingly, even if a phase difference that can bring about a high sensitivity varies with the type or structure of a vibration gyro, it is possible to set such a phase difference that can bring about the high sensitivity. This consequently enables detection of the rotational angular velocity with high sensitivity and increases the ratio to noise (S/N ratio).

A vibration gyro unit according to the present invention, a phase difference of a timing signal for synchronous detection with respect to a driving signal is set on the basis of a phase difference characteristic of a detection sensitivity for an output signal of a differential amplifier circuit. This phase difference characteristic is obtained in advance under a condition where a rotational angular velocity is applied to a vibration gyro in a driving state. Therefore, even if a phase difference that can bring about high sensitivity varies with the type or structure of a vibration gyro, it is possible to set such a phase difference that can bring about the high sensitivity. This consequently enables detection of the rotational angular velocity with a high sensitivity and increases the ratio to noise (S/N ratio). In addition, since, in general, the sensitivity decreases as the size of a vibration gyro is reduced, the capability of detection of a rotational angular velocity with a high sensitivity is advantageous in developing miniaturization of vibration gyro.

A method for detecting a vibration gyro output according to the present invention, a phase difference of a timing signal for synchronous detection with respect to a driving signal is set on the basis of a phase difference characteristic of a detection sensitivity for a signal corresponding to a difference between outputs of two detection pieces of a vibration gyro. This phase difference characteristic is obtained in advance under a condition where a rotational angular velocity is applied to a vibration gyro in a driving state. Accordingly, even if a phase difference that can bring about a high sensitivity varies with the type or structure of a vibration gyro, it is possible to set such a phase difference that can bring about the high sensitivity. This consequently enables detection of the rotational angular velocity with high sensitivity and increases the ratio to noise (S/N ratio).

The invention claimed is:

1. Vibration gyro circuitry comprising:
    a differential amplifier circuit for outputting a signal corresponding to a difference between output signals of two detection pieces of a vibration gyro;
    a synchronous detection circuit for performing synchronous detection on the output signal of the differential amplifier circuit; and
    a phase shift circuit for supplying to the synchronous detection circuit a signal, as a timing signal for the synchronous detection, which is phase-shifted with respect to a drive signal supplied to the vibration gyro, wherein, the phase shift circuit sets a phase difference between the drive signal and the timing signal to be greater than 90 degrees on the basis of a phase difference characteristic of a detection sensitivity for the output signal of the differential amplifier circuit, the phase difference characteristic being obtained in advance under a condition where a rotational angular velocity is applied to the vibration gyro in a driving state.

2. The vibration gyro circuitry of claim 1, wherein the phase shift circuit includes an integrating circuit having a resistor and a capacitor, the integrating circuit being input with the drive signal and delaying the drive signal by the phase difference determined by time constants of the resistor and the capacitor.

3. A vibration gyro unit comprising:

a vibration gyro having two detection pieces;

a differential amplifier circuit for outputting a signal corresponding to a difference between outputs of the detection pieces;

a synchronous detection circuit for performing synchronous detection on the output signal of the differential amplifier circuit; and a phase shift circuit for supplying to the synchronous detection circuit a signal, as a timing signal for the synchronous detection, which is phase-shifted with respect to a drive signal supplied to the vibration gyro, wherein, the phase shift circuit sets a phase difference between the drive signal and the timing signal to be greater than 90 degrees on the basis of a phase difference characteristic of a detection sensitivity for the output signal of the differential amplifier circuit, the phase difference characteristic being obtained in advance under a condition where a rotational angular velocity is applied to the vibration gyro in a driving state.

4. The vibration gyro unit of claim 3, wherein the phase shift circuit includes an integrating circuit having a resistor and a capacitor, the integrating circuit being input with the drive signal and delaying the drive signal by the phase difference determined by time constants of the resistor and the capacitor.

5. A method for detecting a vibration gyro output, the method comprising:

performing synchronous detection on a signal corresponding to a difference between output signals of two detection pieces of a vibration gyro, phase-shifting a timing signal with respect to a drive signal supplied to the vibration gyro, so that a rotational angular velocity applied to the vibration gyro is detected, wherein, the phase shift circuit sets a phase difference between the drive signal and the timing signal to be greater than 90 degrees on the basis of a phase difference characteristic of a detection sensitivity for the signal corresponding to the difference between the output signals of the detection pieces, and the synchronous detection is performed using the timing signal which is phase-shifted by the set phase difference with respect to the drive signal.

6. The method for detecting a vibration gyro output of claim 5, wherein the phase difference is set by adjustment of a resistance of a resistor included in an integrating circuit having the resistor and a capacitor, the integrating circuit being input with the drive signal and delaying the drive signal.

7. The method for detecting a vibration gyro output of claim 5, wherein the phase difference is set by adjustment of a capacitance of a capacitor included in an integrating circuit having a resistor and the capacitor, the integrating circuit being input with the drive signal and delaying the drive signal.

8. The vibration gyro circuitry of claim 1, wherein the phase difference is greater than or equal to 110 degrees and less than or equal to 150 degrees.

9. The vibration gyro unit of claim 3, wherein the phase difference is greater than or equal to 110 degrees and less than or equal to 150 degrees.

10. The method for detecting a vibration gyro output of claim 5, wherein the phase difference is greater than or equal to 110 degrees and less than or equal to 150 degrees.

* * * * *